United States Patent [19]

Sciolla

[11] 4,442,045
[45] Apr. 10, 1984

[54] APPARATUS FOR ADMIXING A GAS TO A LIQUID, IN PARTICULAR FOR ADMIXING OXYGEN TO POLLUTED WATER

[76] Inventor: Lussoria A. Sciolla, Via Ipsitani, 80 Fordongianus (Cagliari), Italy

[21] Appl. No.: 303,667

[22] Filed: Sep. 18, 1981

[30] Foreign Application Priority Data

Sep. 26, 1980 [IT] Italy .................. 3521 A/80

[51] Int. Cl.³ .............................................. B01F 3/04
[52] U.S. Cl. ................ 261/36 R; 210/221.2; 239/428.5; 239/515; 261/DIG. 75
[58] Field of Search ............ 261/91, 93, 120, DIG. 75, 261/36 R, 81; 210/219, 221.1, 221.2; 239/107, 428.5, 498, 505, 515, 518, 524; 209/169, 170; 366/338, 286

[56] References Cited

U.S. PATENT DOCUMENTS

| | | | |
|---|---|---|---|
| 1,575,895 | 3/1926 | Baker | 239/515 |
| 2,666,670 | 1/1954 | McGraw | 239/498 |
| 2,678,914 | 5/1954 | Kalinske | 210/221.1 |
| 3,218,042 | 11/1965 | Ciabattari et al. | 261/91 |
| 3,745,387 | 7/1973 | Sydnor, Jr. et al. | 261/91 |
| 3,935,156 | 1/1976 | Richter | 261/120 |
| 4,193,951 | 3/1980 | Stanley | 261/91 |

FOREIGN PATENT DOCUMENTS

| | | | |
|---|---|---|---|
| 331219 | 6/1930 | United Kingdom | 261/91 |
| 862761 | 3/1961 | United Kingdom | 261/91 |
| 1173254 | 12/1969 | United Kingdom | 261/91 |

Primary Examiner—Richard L. Chiesa
Attorney, Agent, or Firm—Guido Modiano; Albert Jsif

[57] ABSTRACT

The apparatus comprises a vertical tubular column having a lower inlet connected to a pump and an upper outlet, a deflector of inverted-cone shape and extending through the outlet coaxially with the column a threaded shank rigid with the deflector for adjusting the axial position thereof relatively to the column, and a laminating plate coaxially located above the deflector and provided with a central opening communicating with an axial gas intake conduit.

3 Claims, 1 Drawing Figure

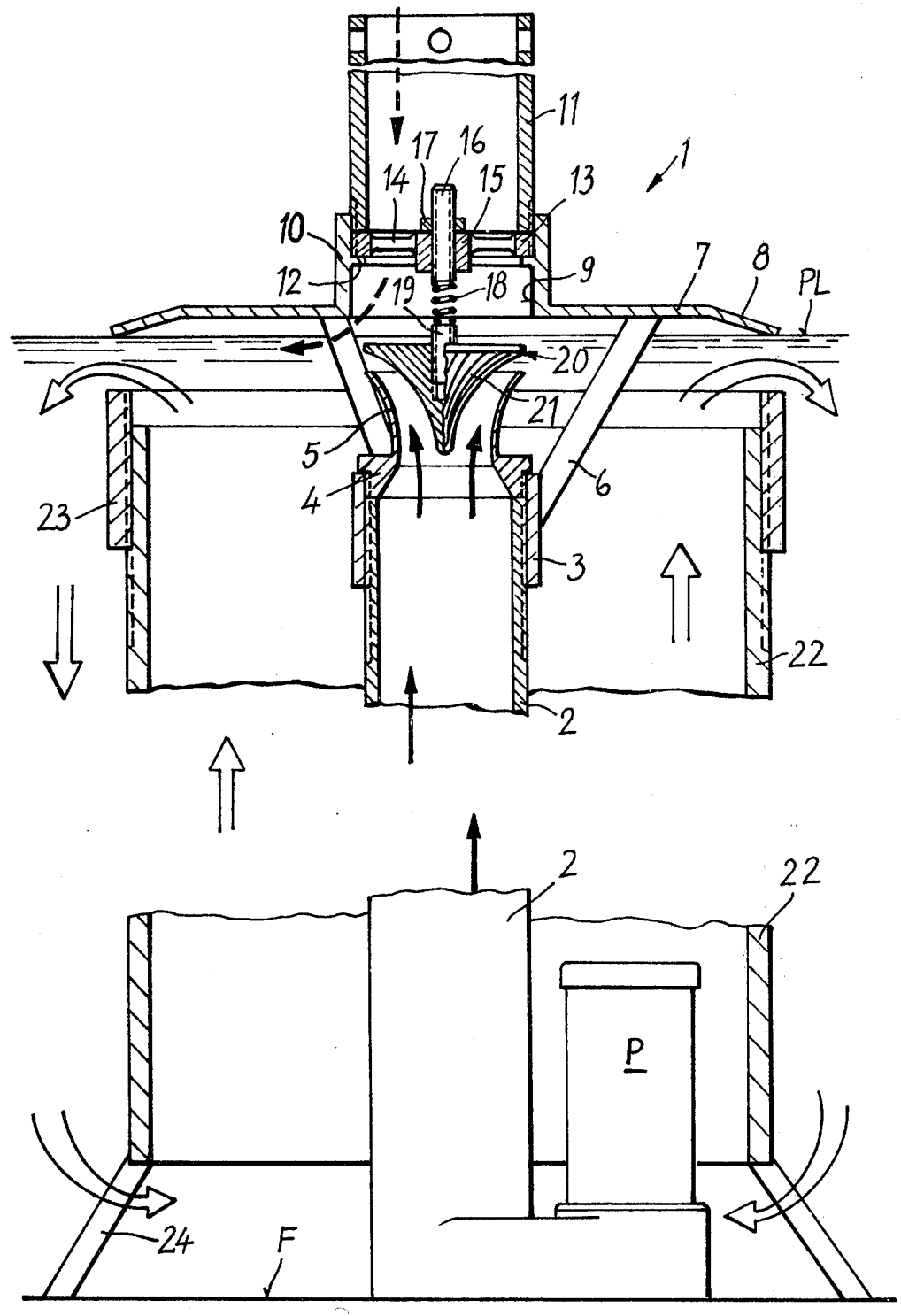

APPARATUS FOR ADMIXING A GAS TO A LIQUID, IN PARTICULAR FOR ADMIXING OXYGEN TO POLLUTED WATER

BACKGROUND OF THE INVENTION

This invention relates to an apparatus for admixing a gas to a liquid, in particular for admixing oxygen to polluted water.

It is known to treat polluted water with active slurries and oxygen; in practice, the apparatus utilized for such treatment are required to provide for the mixing of water with the slurries and oxygen, the whole operation being carried out within a tank, in the interior whereof the pollutants and slurries will tend to settle at the tank bottom, whereas the purified water will flow over the tank top.

The apparatus currently employed to effect the foregoing treatments exhibit some drawbacks, mainly arising from the addition of oxygen being carried out in a relatively ineffective way, as poorly effective is the the stirring of water and the slurries together.

SUMMARY OF THE INVENTION

Thus, the task of this invention is to provide an apparatus for admixing a gas to a liquid, in particular for admixing oxygen to polluted water, which is both effective to enrich water with oxygen and stir water and the slurries together, while affording the possibility of adjusting the amount of air admitted and the stirring characteristics of water and the slurries.

According to one aspect of the present invention, this task is achieved by an apparatus for admixing a gas to a liquid, in particular for admixing oxygen to polluted water, characterized in that it comprises a vertical tubular column having a lower inlet connected to a pump and an upper outlet, a deflector substantially in the form of an inverted cone and extending through said outlet coaxially with said column, means for adjusting the axial position of said deflector relatively to said column, a laminating plate carried above said deflector coaxially therewith and provided with a central opening communicating with an axial gas intake conduit.

BRIEF DESCRIPTION OF THE DRAWING

Further features will be more clearly apparent from the following detailed description of a preferred embodiment of an apparatus according to the invention, with reference to the accompanying drawing, where the one FIGURE shown is a sectional side view, taken in a diametrical plane, of the inventive apparatus.

DESCRIPTION OF THE PREFERRED EMBODIMENTS

With reference to the drawing FIGURE, there is generally indicated at 1 an apparatus according to the invention, which is shown arranged in a tank containing a liquid to be oxygenated, the free surface whereof is designated with reference characters PL, its bottom being designated with the character F.

The apparatus 1 comprises a vertical tubular column 2 which is arranged to rest on the tank bottom and has a lower inlet connected to the delivery end of a pump P, which may be either immersed in the tank as shown, or be mounted on the tank exterior and connected to the column through a conduit. The column 2 has a threaded portion at the top which is threadably engaged by a ring nut 3 a portion whereof is allowed to protrude. Said portion threadably accommodates a ring 4 which has a horn 5 configured to form a neck at the upper outlet of the column.

To the ring nut 3 are welded a set of sloping arms 6 which support a laminating plate 7 having a downwardly diverging frusto-conical edge 8; the plate is formed with a central opening 9 open to an upper sleeve 10 which extends coaxial with the tubular column 2 and has a threaded portion for engagement with the lower end of a tube 11; between the lower end of the tube 11 and an inner flange 12 of the sleeve 10, there is clamped a plate 13 with spokes 14. The spokes 14 are rigid with a central hub 15 formed with a threaded axial through hole, and define openings therebetween.

Into the hole of the hub 15, there is threaded a threaded shank 16 which can be locked to the hub by tightening a locknut 17; to the bottom of the shank 16, there is rigidly connected a compression coil spring 18, under which is rigidly mounted a further threaded shank 19 axially led into a deflector 20.

The deflector 20 has a substantially conical shape with the apex facing the upper inlet of the column 2 and its external surface made slightly concave. On the external surface of the deflector, there are arranged at evenly distributed angular positions a plurality of radial fins 21. The deflector 20 penetrates the horn 5 such as to form an annular passageway having an upwardly tapering cross-sectional configuration.

On the exterior of the column 2, there is supported in coaxial relationship, with the aid of small radial arms not shown, a tubular conduit 22 the upper end whereof threadably accommodates a tubular portion or section 23 which enables adjustment of the gap between the free surface PL and upper edge of the conduit 22; with the bottom of the conduit 22, there are rigid a plurality of feet 24 which are effective to hold the conduit mouth at a given height above the bottom F.

The apparatus according to the invention operates as follows. The assembly is first positioned with the plate 7 located approximately level with the free surface of the liquid to be treated, whereafter the pump P is operated.

The liquid is pumped up along the column 2, and upon reaching the top, thanks to the deflector 20, is deflected into a substantially radial direction to the plate 7; depending on the shape of the horn and distance from the deflector to the column top, which factors may be varied by replacing the horn and manipulating the shank 16 and locknut 17, it is possible to vary the liquid flow characteristics; in actual practice, by reducing the horn diameter, the flow rate is reduced but the flow velocity is increased; as the fluid velocity increases, owing to the Venturi effect, the vacuum at the opening 9 also increases, as does the amount of air drawn into the tube 11. The oxygenation characteristics are varied concurrently with the flow characteristics, since the displacement of the deflector results in a change of the gap between the deflector 20 and plate 7.

It should be noted that the portion or section of coil spring 18 allows the deflector to perform axial and radial movements, thereby any solids which may be present in the liquid to be treated, instead of clogging the column, can be expelled to prevent undesired clogging build-ups.

Between the column 2 and conduit 22, there is defined an annular space, wherethrough there will flow in an upward direction, as drawn in by the flow of liquid in the column 2, liquid which is not oxygenated but produces an effective stirring action in the tank; it should be noted that, once the oxygenation parameters have been set as mentioned, the liquid stirring characteristics may be changed in the tank by adjusting the height of the conduit mouth relatively to the free surface.

In the drawing FIGURE, small full line arrows indicate the flow of the liquid being oxygenated, small dash line arrows indicate the airflow, and ghost line arrows indicate the stirring movement flow of the liquid in the tank.

It should be noted that since the pump P acts directly upon the liquid to be treated, the power rating of said pump may be extremely small with respect to that of the pumps currently employed on conventional systems.

I claim:

1. An apparatus for admixing a gas to a liquid, in particular for admixing oxygen to polluted water, comprising:
    a tank containing a liquid to be oxygenated, said liquid having a free surface;
    a vertical tubular column having a lower inlet and an upper outlet, said column being immersed, in use, in said liquid to be oxygenated, said upper outlet extending, in use, below the free surface of the liquid;
    a pump connected to said lower inlet and adapted to draw the liquid into said tubular column through said lower inlet and to pump it upwardly to said upper outlet;
    a liquid deflector substantially in the form of an inverted cone, said deflector extending through said outlet coaxially with said column, being, in use, at least partially immersed and diverting the liquid flowing vertically through said column in a substantially radial direction with respect to said column;
    a laminating plate located above said deflector and, in use, approximately level with the free surface of the liquid, said laminating plate having a central opening coaxial with said column, said opening being smaller than said laminating plate;
    an upper axial gas intake conduit fixed to said laminating plate, coaxial and communicating with said central opening; and
    means supported by said intake conduit for adjusting the axial position of said deflector relatively to said column.

2. An apparatus for admixing a gas to a liquid, in particular for admixing oxygen to polluted water, comprising:
    a tank containing a liquid to be oxygenated, said liquid having a free surface;
    a vertical tubular column having a lower inlet and an upper outlet, said column being immersed, in use, in said liquid to be oxygenated, said upper outlet extending, in use, below the free surface of the liquid;
    a pump connected to said lower inlet and adapted to draw the liquid into said tubular column through said lower inlet and to pump it upwardly to said upper outlet;
    a liquid deflector substantially in the form of an inverted cone, said deflector extending through said outlet coaxially with said column, being, in use, at least partially immersed and diverting the liquid flowing vertically through said column in a substantially radial direction with respect to said column;
    a laminating plate located above said deflector and, in use, approximately level with the free surface of the liquid, said laminating plate having a central opening coaxial with said column, said opening being smaller than said laminating plate;
    an upper axial gas intake conduit fixed to said laminating plate, coaxial and communicating with said central opening; and
    means supported by said intake conduit for adjusting the axial position of said deflector relatively to said column, wherein said means for adjusting comprises at least one threaded shank connected to said deflector and coaxial with said intake conduit, a threaded hub cooperating with said at least one shank and arranged coaxially in said intake conduit, and an annular ring having radial spokes fixed to said hub, said ring being fixed to said laminating plate in the central opening thereof.

3. An apparatus according to claim 2, wherein said threaded shank is connected to said deflector by means of a second threaded shank having a first end and a second end, and of a compression coil spring having a first end and a second end, said first coil spring end being rigidly connected to said first shank, said second coil spring end being rigidly connected to said first end of said second shank and said second end of said second shank being screwed into said deflector.

* * * * *